(12) United States Patent
Hung

(10) Patent No.: US 11,197,740 B2
(45) Date of Patent: Dec. 14, 2021

(54) ORTHODONTIC CORRECTION DEVICE

(71) Applicant: Cheng-Hsiang Hung, New Taipei (TW)

(72) Inventor: Cheng-Hsiang Hung, New Taipei (TW)

( * ) Notice: Subject to any disclaimer, the term of this patent is extended or adjusted under 35 U.S.C. 154(b) by 219 days.

(21) Appl. No.: 16/102,929

(22) Filed: Aug. 14, 2018

(65) Prior Publication Data

US 2019/0046294 A1 Feb. 14, 2019

Related U.S. Application Data

(60) Provisional application No. 62/545,047, filed on Aug. 14, 2017.

(51) Int. Cl.
*A61C 7/08* (2006.01)
*A61C 7/14* (2006.01)
*A61C 7/22* (2006.01)

(52) U.S. Cl.
CPC ............ *A61C 7/08* (2013.01); *A61C 7/14* (2013.01); *A61C 7/22* (2013.01)

(58) Field of Classification Search
CPC .... A61C 7/08; A61C 7/14; A61C 7/22; A61C 7/146; A61C 7/303; A61C 7/145; A61C 7/282; A61C 7/20; A61C 7/12; A61C 7/30; A61C 7/141; A61C 7/148
USPC .......................................... 433/6, 5
See application file for complete search history.

(56) References Cited

U.S. PATENT DOCUMENTS

| 5,145,364 A * | 9/1992 | Martz ................. A61C 7/00 433/18 |
| 5,580,243 A * | 12/1996 | Bloore ................ A61C 7/22 433/17 |
| 5,683,244 A | 11/1997 | Truax |
| 2003/0198911 A1 | 10/2003 | Knopp et al. |

(Continued)

FOREIGN PATENT DOCUMENTS

| KR | 10-1676205 B1 | 11/2016 |
| WO | WO 00/41643 A1 | 7/2000 |
| WO | WO 2015/040495 A2 | 3/2015 |

OTHER PUBLICATIONS

European Patent Office, Search Report, Patent Application Serial No. 18188762.1, dated Dec. 5, 2018, Europe.

(Continued)

*Primary Examiner* — Nicholas D Lucchesi
*Assistant Examiner* — Mirayda A Aponte

(57) ABSTRACT

An orthodontic correction device includes a masticatory unit with a rigid body. The masticatory unit can be removably worn on a dental arch and does not deform when accommodating misaligned teeth. A recess is formed in the masticatory unit to accommodate a tooth of the dental arch which requires orthodontic correction. A guiding groove is formed on the occlusal surface of the masticatory unit. An elastic member is configured to stretch across the occlusal surface of the masticatory unit, retained in the guiding groove, and coupled with several connection parts affixed to the buccal surface and lingual surface of the tooth. Occlusal loading generated during mastication is transmitted to the (Continued)

teeth of the dental arch through the masticatory unit and activates the elastic member to move the tooth to its desired position. The orientation of the guiding groove determines the moving direction of the tooth.

13 Claims, 15 Drawing Sheets

(56) References Cited

U.S. PATENT DOCUMENTS

2016/0310237 A1* 10/2016 Hung ..................... A61C 7/08
2017/0007360 A1   1/2017 Kopelman et al.

OTHER PUBLICATIONS

Intellectual Property Office of the Philippines, Search Report, Patent Application Serial No. 1/2018/000217, dated Jan. 16, 2019, Philippines.

* cited by examiner

ORTHODONTIC CORRECTION DEVICE

CROSS REFERENCE TO RELATED APPLICATIONS

The present application claims the benefit of U.S. Provisional Application No. 62/545,047, filed on Aug. 14, 2017, the entirety of which is incorporated by reference herein.

BACKGROUND OF THE INVENTION

Field of the Invention

The present application relates to an orthodontic correction technology; and in particular to a patient removable orthodontic correction device designed to correct unerupted or partially erupted teeth positioned below the occlusal surface.

Description of the Related Art

Misaligned teeth can adversely affect a person's dental aesthetics, functions, and health. The goal of orthodontic correction is to bring the teeth into proper alignment by using appliances which exert mechanical forces to move the teeth to positions or orientations where the dental functions are improved.

Conventional braces use archwires and brackets to induce force on the teeth. The archwire is pre-shaped and interconnects the teeth through brackets that are fixed to the surfaces of the teeth. When initially installed, the archwire elastically deforms to accommodate the misaligned teeth. The archwire is resilient and exerts forces on the teeth through the brackets to bring the teeth into alignment with the pre-shaped form of the archwire. The archwire exerts continuous forces on the teeth to urge them to their desired positions.

Compared to fixed orthodontic braces, removable appliances are an improvement in terms of being less visible and easier to maintain oral hygiene. Making use of the appliance's own resilient property is also the working principle with clear aligners. The body or shell of clear aligners used in prior art is flexible and deforms when the appliance is worn, providing resilient corrective force as it tries to return to its original shape. Conventional clear aligners are required to be worn over 20 hours per day to provide continuous corrective force and are removed when eating or chewing for cleaning teeth.

Unerupted teeth or partially erupted teeth is a type of misaligned teeth which is difficult to correct. Conventional braces or clear aligners do not successfully guide the unerupted or partially erupted teeth to their desired positions (e.g., the fully erupted and normal positions). Other prior art discloses using temporary anchorage devices (TADs) or mini-screws along with elastics coupled to connectors fixed on the unerupted or partially erupted teeth to exert a pulling force to correct this problem. However, TADs are not patient removable, and the intrusive nature of the device is a source of infection and discomfort to the patient.

Therefore, it is needed to provide an orthodontic correction device that can overcome the aforementioned problems.

BRIEF SUMMARY OF THE INVENTION

An object of the invention is to provide a non-intrusive and patient removable orthodontic correction device that can guide the unerupted or partially erupted teeth positioned below the occlusal surface to their desired positions (e.g., the fully erupted and normal positions).

In some embodiments of the invention, an orthodontic correction device is provided, including a masticatory unit, a number of first connection parts, and a first elastic member. The masticatory unit has a rigid body and is configured to be removably worn on a dental arch. The masticatory unit does not deform when accommodating misaligned teeth of the dental arch. The material strength of the masticatory unit is sufficient to withstand the occlusal loading generated during mastication. A first recess is formed in the masticatory unit and configured to accommodate a first tooth of the dental arch that is an unerupted or partially erupted tooth requiring orthodontic correction. The first recess has a shape that allows the first tooth to move from its initial position to its desired position. A first guiding groove is formed on an occlusal surface of the masticatory unit. The first connection parts are respectively affixed to the opposing buccal surface and lingual surface of the first tooth. The first elastic member is configured to stretch across the occlusal surface of the masticatory unit, is retained in the first guiding groove, and is coupled with the first connecting parts affixed to the first tooth. The occlusal loading generated during mastication is transmitted to the teeth of the dental arch through the masticatory unit and activates the first elastic member to drive the first tooth to the desired position. The orientation of the first guiding groove determines the moving direction of the first tooth.

In some embodiments, the masticatory unit further has a number of second recesses configured to accommodate second teeth of the dental arch which do not require orthodontic correction. The shapes of the second recesses conform to the shapes of the second teeth. The occlusal loading generated during mastication is transmitted to the second teeth and the first tooth adjacent to the second teeth through the second recesses of the masticatory unit.

In some embodiments, the masticatory unit further has a number of guiding openings respectively formed on a buccal sidewall and a lingual sidewall of the masticatory unit and corresponding to the first tooth. When the first elastic member drives the first tooth to move, the guiding openings allow the first connection parts affixed to the buccal surface and the lingual surface of the first tooth to move therein. The orientation and the length of the guiding openings determine the moving direction and the moving distance of the first tooth.

In some embodiments, the masticatory unit further has a number of additional openings respectively formed on a buccal sidewall and a lingual sidewall of the masticatory unit and corresponding to one of the second teeth. The orthodontic correction device further comprises a number of second connection parts and a second elastic member. The second connection parts are respectively affixed to the buccal side and the lingual side of the second tooth exposed by the additional openings. The second elastic member is configured to stretch across the occlusal surface of the masticatory unit to couple with the second connection parts affixed to the second tooth, so as to increase the retention of the masticatory unit on the dental arch.

In some embodiments, the occlusal surface of the masticatory unit further forms an additional groove configured to retain the second elastic member therein.

In some embodiments, the orthodontic correction device further includes a third connection part and a third elastic member. The third connecting part is affixed to one of the buccal sidewall and the lingual sidewall of the masticatory unit. The third elastic member is configured to couple with the third connection part and at least one of the first connection parts affixed to the first tooth, so as to generate an auxiliary resilient force to guide the movement of the first tooth.

In some embodiments, at least one additional guiding groove is also formed on at least one of the occlusal surface, the buccal sidewall and the lingual sidewall of the masticatory unit and configured to retain the third elastic member therein.

In some embodiments, the occlusal surface of the masticatory unit further has a number of cusps features and a number of fossae features.

In some embodiments of the invention, another orthodontic correction device is provided, including a masticatory unit, a number of first connection parts, and a first elastic member. The masticatory unit has a rigid body and is configured to be removably worn on a dental arch. The masticatory unit does not deform when accommodating misaligned teeth of the dental arch. The material strength of the masticatory unit is sufficient to withstand the occlusal loading generated during mastication. A first recess is formed in the masticatory unit and configured to accommodate a first tooth of the dental arch that is an unerupted or partially erupted tooth requiring orthodontic correction. The first recess has a shape that allows the first tooth to move from its initial position to its desired position. A guiding hole is formed in the wall under an occlusal surface of the masticatory unit and extends from a buccal sidewall of the masticatory unit to a lingual sidewall of the masticatory unit that is opposite the buccal sidewall. The first connection parts are respectively affixed to the opposing buccal surface and lingual surface of the first tooth. The first elastic member is configured to pass through the guiding hole to couple with the first connection parts affixed to the first tooth. The occlusal loading generated during mastication is transmitted to the teeth of the dental arch through the masticatory unit and activates the first elastic member to drive the first tooth to the desired position. The orientation of the guiding hole determines the moving direction of the first tooth.

In some embodiments of the invention, another orthodontic correction device is also provided, including a correction unit, a number of first connection parts, and a first elastic member. The correction unit is configured to be removably worn on a dental arch. When worn, the correction unit is flexible to accommodate misaligned teeth of the dental arch. A first recess is formed in the correction unit and configured to accommodate a first tooth of the dental arch that is an unerupted or partially erupted tooth requiring orthodontic correction. A number of raised guiding parts are formed on at least one surface of the correction unit corresponding to the first tooth, and the raised guiding parts are parallel to each other. The first connection parts are respectively affixed to the opposing buccal surface and lingual surface of the first tooth. The first elastic member is configured to stretch across an occlusal surface of the correction unit, is retained between the raised guiding parts, and is coupled with the first connection parts affixed to the first tooth, so as to generate a resilient force to drive the first tooth to its desired position. The orientation of the raised guiding parts determines the moving direction of the first tooth.

In some embodiments, the raised guiding parts include a pair of raised guiding parts formed on the occlusal surface of the correction unit and extending from a buccal edge of the occlusal surface to a lingual edge of the occlusal surface that is opposite the buccal edge.

In some embodiments, the raised guiding parts include multiple pairs of raised guiding parts formed on the occlusal surface of the correction unit and between a buccal edge of the occlusal surface and a lingual edge of the occlusal surface that is opposite the buccal edge.

In some embodiments, the raised guiding parts include multiple pairs of raised guiding parts respectively formed on a buccal sidewall of the correction unit and a lingual sidewall of the correction unit that is opposite the buccal sidewall.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1A:
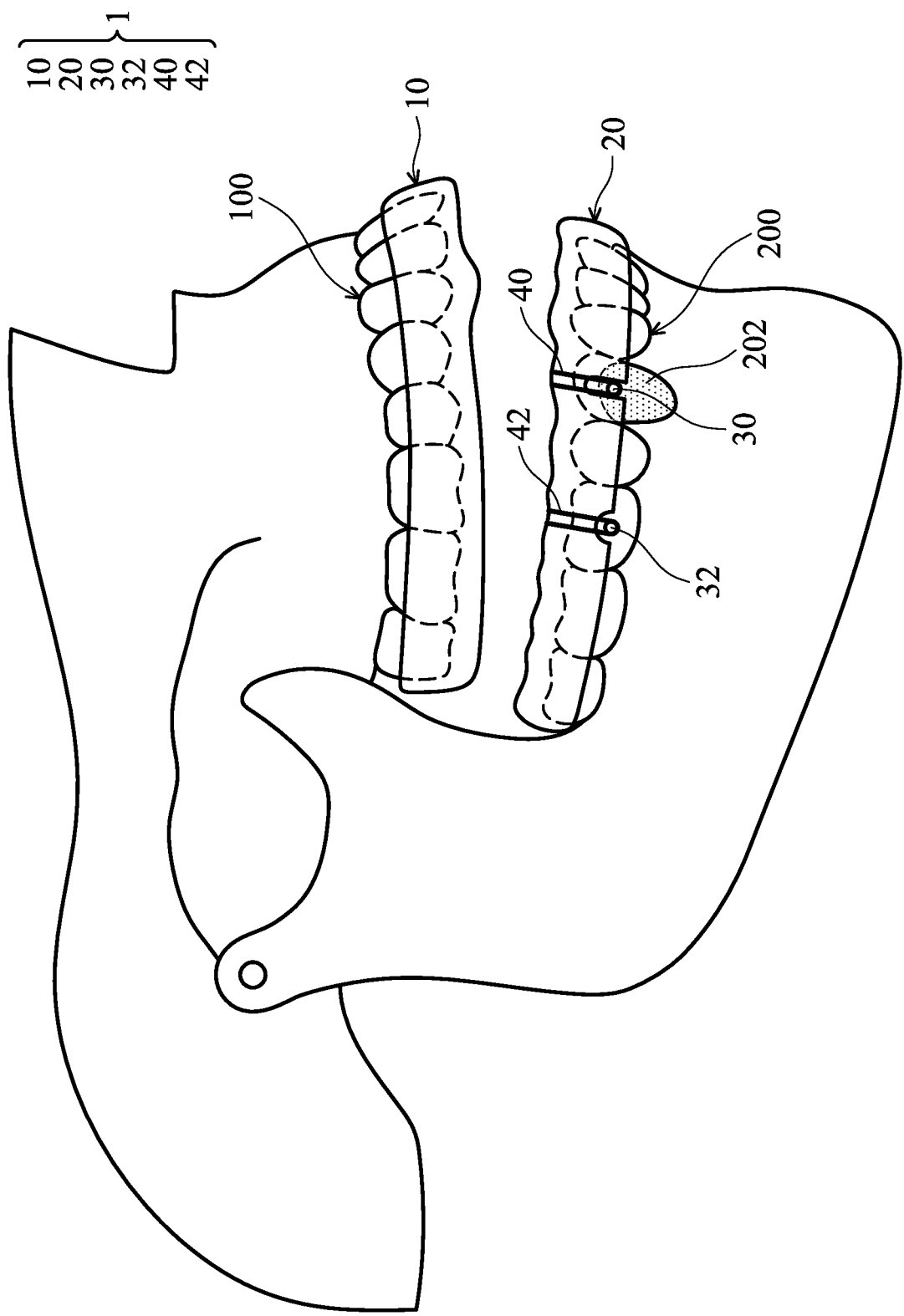
FIG. 1A is a schematic view illustrating the patient wearing an orthodontic correction device with two masticatory units, in accordance with some embodiments of the invention.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In the following detailed description, spatially relative terms, such as "on", "above", "under", "below", "left" and "right" are used for representing the relationship between the relative positions of each element as illustrated in the drawings, and are not meant to limit the invention. The spatially relative terms are intended to encompass different orientations of the device in use or operation in addition to the orientation depicted in the figures.

In addition, the present disclosure may repeat reference numerals and/or letters in the various examples. This repetition is for the purpose of simplicity and clarity and does not in itself dictate a relationship between the various embodiments and/or configurations discussed. Various features may be arbitrarily drawn in different scales for the sake of simplicity and clarity. Furthermore, some elements not shown or described in the embodiments have the forms known by persons skilled in the field of the invention.

Referring to FIG. 1A, which is a schematic view illustrating the patient wearing an orthodontic correction device 1, in accordance with some embodiments of the invention. As shown in FIG. 1A, the orthodontic correction device 1 includes a first masticatory unit 10 with a rigid body and a second masticatory unit 20 with a rigid body, wherein the first and second masticatory units 10 and 20 are removably worn on the maxillary dental arch 100 and the mandibular dental arch 200 of the patient, respectively. Therefore, the patient can freely wear or remove the first and second masticatory units 10 and 20 according to the occasion and needs, and can clean teeth normally (convenient to use).

Being rigid bodies, the first and second masticatory units 10 and 20 can be worn during mastication, such as eating food and chewing gum, and the patient do not have to worry about possible damage to the first and second masticatory units 10 and 20. In some embodiments, the first and second masticatory units 10 and 20 may be made of acrylic resin, resin splint materials or resin denture materials suitable for use in oral applications, and can have appropriate and enough hardness to meet biological and mechanical requirements. For example, the first and second masticatory units 10 and 20 can withstand short-term to moderate duration of functional/occlusal loads and wear without deformation.

Figure 1B:
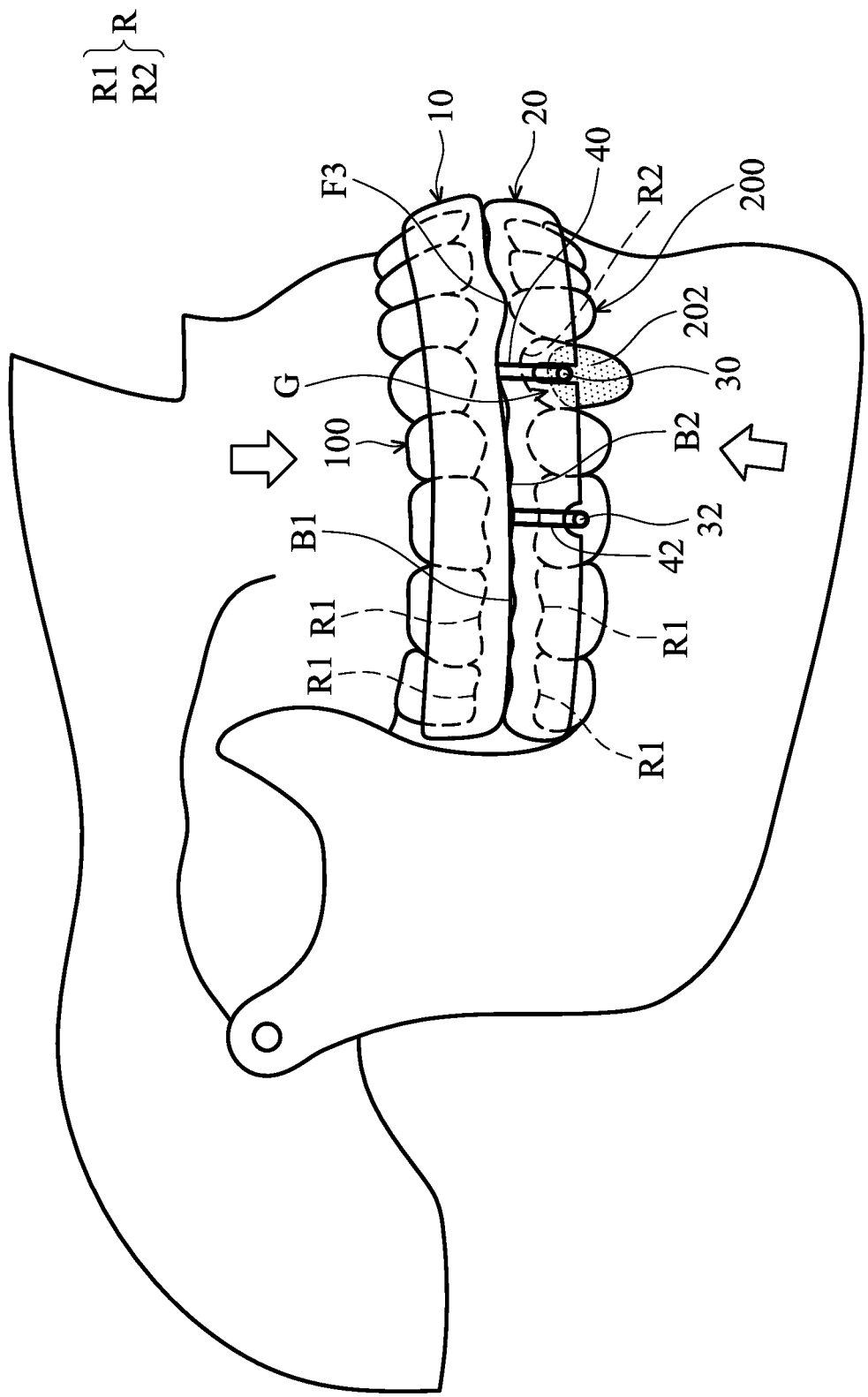
FIG. 1B is a schematic view illustrating the first and second masticatory units of the orthodontic correction device in FIG. 1A in occlusion during mastication of the patient.

FIG. 1B is a schematic view illustrating the first and second masticatory units 10 and 20 of the orthodontic correction device 1 in occlusion during mastication of the patient. First, it should be understood that when the patient wears the first and second masticatory units 10 and 20 during mastication, occlusal loading resulting from the occlusion of the maxillary dental arch 100 and the mandibular dental arch 200 can be transmitted to each tooth through the first and second masticatory units 10 and 20 and to the surrounding alveolar bone under the hydrostatic pressure effect of periodontal membrane, thereby acting as a driving/corrective force of the orthodontic correction device 1 (this working principle will be further illustrated in detail later).

It is also noted that the rigid bodies of the first and second masticatory units 10 and 20 do not deform or apply resilient corrective force against the teeth, and their shape are maintained without deformation when accommodating misaligned teeth even under loading from occlusal forces. In contrast, clear aligners used in prior art (described above) are flexible and deform to try to accommodate misaligned teeth. The deformed aligner body or shell applies resilient force against the misaligned teeth as the aligner body or shell tries to return to its original shape, to correct the misaligned teeth.

Referring to FIG. 1B, a number of recesses R (indicated by dashed lines) are formed on the inner surface (also referred to as a tooth receiving surface) of the first and second masticatory units 10 and 20 for accommodating the teeth of the maxillary and mandibular dental arches 100 and 200 of the patient. In some embodiments as illustrated in FIG. 1B, a first premolar 202 in the mandibular dental arch 200 is an unerupted tooth or partially erupted tooth (first tooth) requiring correction, and the first tooth 202 may also be biased either toward the buccal side or the lingual side thereof (not shown). In addition, the recesses R of the first and second masticatory units 10 and 20 includes a number of (second) recesses R1 and one (first) recess R2 (formed on the inner surface of the second masticatory unit 20). When the first and second masticatory units 10 and 20 are worn (FIG. 1B), the positions of the (second) recesses R1 respectively correspond to positions of the patient's teeth (second teeth) which don't require orthodontic correction, and the shapes of the second recesses R1 conform to the shapes of the corresponding second teeth of the maxillary and mandibular dental arches 100 and 200. The position of the first recess R2 corresponds to the position of the patient's tooth (first tooth, e.g., first premolar 202) in malposition which requires orthodontic correction, and a space G is formed between the first recess R2 and the first premolar 202.

The number and position of the first recess R2 may also change accordingly when the number and position of the patient's (first) tooth or teeth requiring correction are changed in different embodiments. For example, the first tooth needing correction may also be located in the maxillary dental arch 100, and the first recess R2 may be disposed on the inner surface of the first masticatory unit 10 to correspond to the first tooth.

When the patient wears the first and second masticatory units 10 and 20 during mastication, occlusal loading resulting from the occlusion of the maxillary dental arch 100 and the mandibular dental arch 200 is exerted through the first and second masticatory units 10 and 20 and distributed to each tooth. Then, the occlusal loading on each tooth is transmitted to the root and the periodontal ligament, and to the surrounding alveolar bone under the hydrostatic pressure effect. More specifically, the occlusal loading is transmitted to the second teeth (and the first tooth adjacent to the second teeth) through the second recesses R1 (they are in direct contact with the second teeth which don't require correction) of the first and second masticatory units 10 and 20. At this time, the second recesses R1 can maintain and limit the movement of the second teeth. On the other hand, the first tooth is allowed to move in the space G under the action of the occlusal loading. Therefore, the occlusal loading is a corrective force that can be used to move the (first) tooth requiring correction, and the corrective force is exerted intermittently and physiologically on the teeth, which can reduce the discomfort of the patient. In addition, the occlusal loading can also act as a driving force for activating at least one first elastic member 40 (which will be illustrated later) of the orthodontic correction device 1.

It should also be understood that the corrective working principle of the orthodontic correction device 1 is clearly different from the corrective working principle of the prior art (for example, clear aligners). Orthodontic tooth movement is a process wherein mechanical force is applied to a tooth to cause bone remodeling. Tooth movement in the alveolar bone is actually the formation of new bone on the tension side of the periodontal ligament and bone resorption on the compression side. Light force is desirable because bone resorption occurs directly with less cell death, allowing a tooth to move through the alveolar bone more easily. Heavy and continuous force is undesirable because cell death in the periodontal ligament halts tooth movement and the long duration of the root surface of the tooth contacting the wall of the alveolar socket increases root resorption risks. As describe above, in the case of clear aligners used in prior art, the body of the aligner is flexible and applies resilient force on the tooth in malposition, also in a constant way over 20 hours per day. In contrast, the rigid bodies of the first and second masticatory units 10 and 20 of the orthodontic correction device 1 in some embodiments of the invention are not flexible and do not deform when the device is worn during mastication (even under the occlusal loading). In particular, the orthodontic correction device 1 relies on intermittent short-duration occlusal loading generated during mastication for the driving force/orthodontic corrective force, reducing the time and discomfort of wearing the device while accelerating orthodontic tooth movement.

In some embodiments, the orthodontic correction device 1 can also utilize the resilient restoring force of an elastic member as a corrective force to more efficiently and quickly guide the first tooth that is an unerupted tooth or partially erupted tooth requiring correction (e.g., the first premolar 202 in the mandibular dental arch 200) to its corrected finish position or desired position (e.g., the fully erupted and normal position aligned with other teeth). In some embodiments, the first recess R2 also has a shape that allows the first tooth to move from an initial (misaligned) position to a desired position (or corrected finish position), that is, the shape of the first recess R2 determines the desired position of the first tooth.

Figure 2:
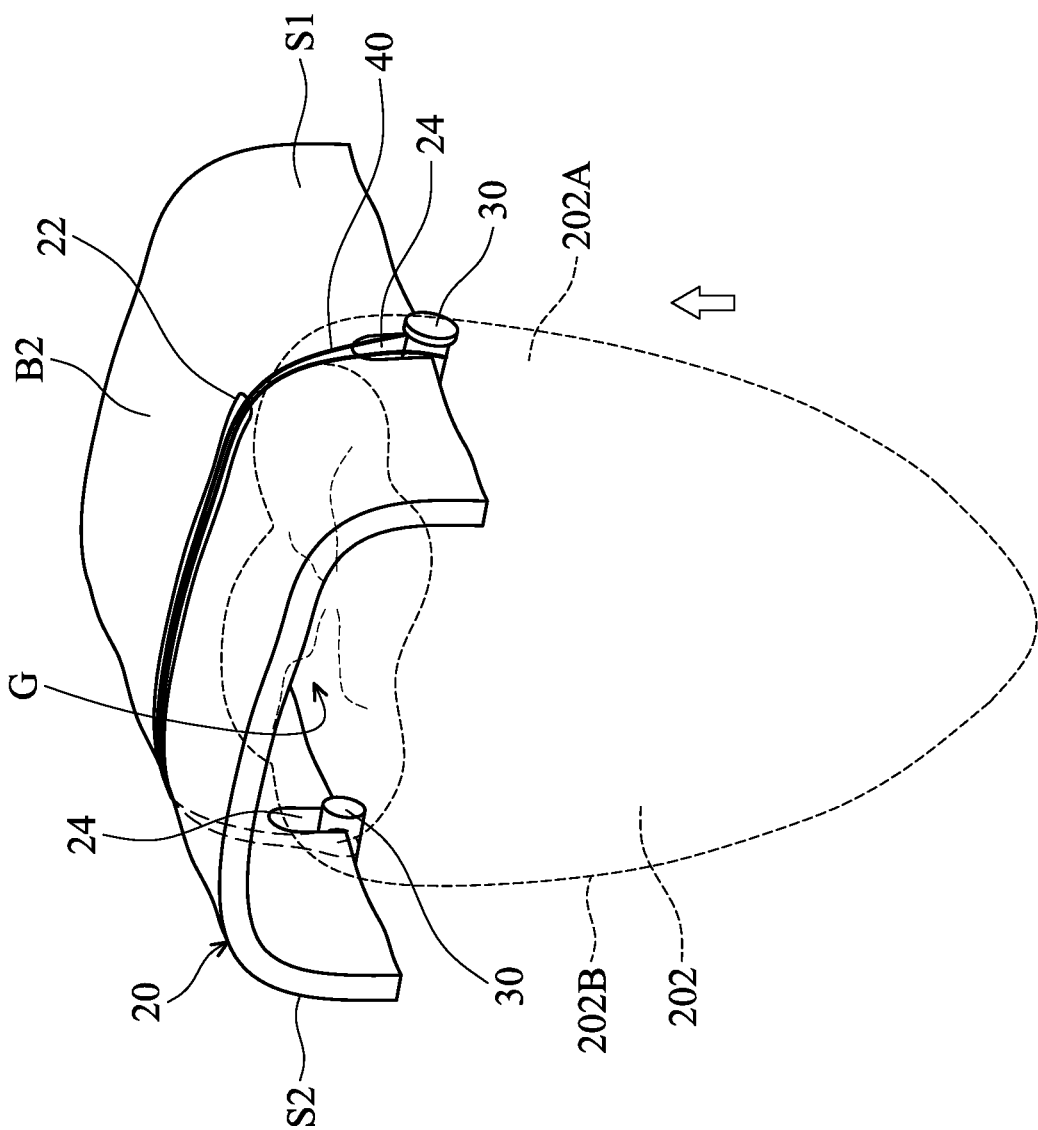
FIG. 2 is a schematic perspective view illustrating the configuration of a first elastic member of the orthodontic correction device, in accordance with some embodiments.

Referring to FIG. 1B and FIG. 2, wherein FIG. 2 is a schematic perspective view illustrating the configuration of a first elastic member 40 of the orthodontic correction device 1 (FIG. 1B), in accordance with some embodiments. The first elastic member 40 can be configured to stretch across the occlusal surface B2 of the masticatory unit 20, and both ends of the first elastic member 40 are respectively coupled with two first connection parts 30 affixed to the opposing buccal surface 202A and lingual surface 202B of the first tooth (first premolar 202). In some embodiments, the first connection parts 30 each may have a hook structure (but not limited thereto) and may be affixed to the first premolar 202 by, for example, adhesive. The material of the first connection parts 30 may comprise stainless steel, nickel titanium alloy, or plastic ceramic. In some embodiments, the first elastic member 40 may be a spring, an elastic band, or a power chain.

With the above configuration, when the patient wears the orthodontic correction device 1 during mastication, the occlusal loading, in addition to being transmitted to each tooth through the first and second masticatory unit 10 and 20, can also activate the stretched first elastic member 40 to drive the first tooth (first premolar 202) to its desired position (or corrected finish position). In some embodiments, the first elastic member 40 is a lifting member that can generate or apply a resilient (restoring) force to pull the first tooth out of the alveolar bone (as indicated by the arrow in FIG. 2) and reach its fully erupted position.

Referring to FIG. 2, a first guiding groove 22 may be formed on the occlusal surface B2 of the masticatory unit 20 for retaining the first elastic member 40 therein and preventing the first elastic member 40 from slipping on the occlusal surface B2 during the correction process. In some embodiments, the orientation of the first guiding groove determines the moving direction of the first tooth. For example, when the first guiding groove 22 is formed on the occlusal surface B2 in a straight line (such as extending from the buccal edge of the occlusal surface B2 to the lingual edge of the occlusal surface B2) and is disposed to correspond to a central position of the (inner) surface of the first recess R2, the first elastic member 40 retained in the first guiding groove 22 can exert a resilient force to pull the first tooth toward the central position of the surface of the first recess R2. When the orientation of the first guiding groove 22 is offset with respect to the central position of the surface of the first recess R2, the first elastic member 40 retained in the first guiding groove 22 can exert a resilient force to pull the first tooth toward the orientation of the first guiding groove 22.

Figure 3A:
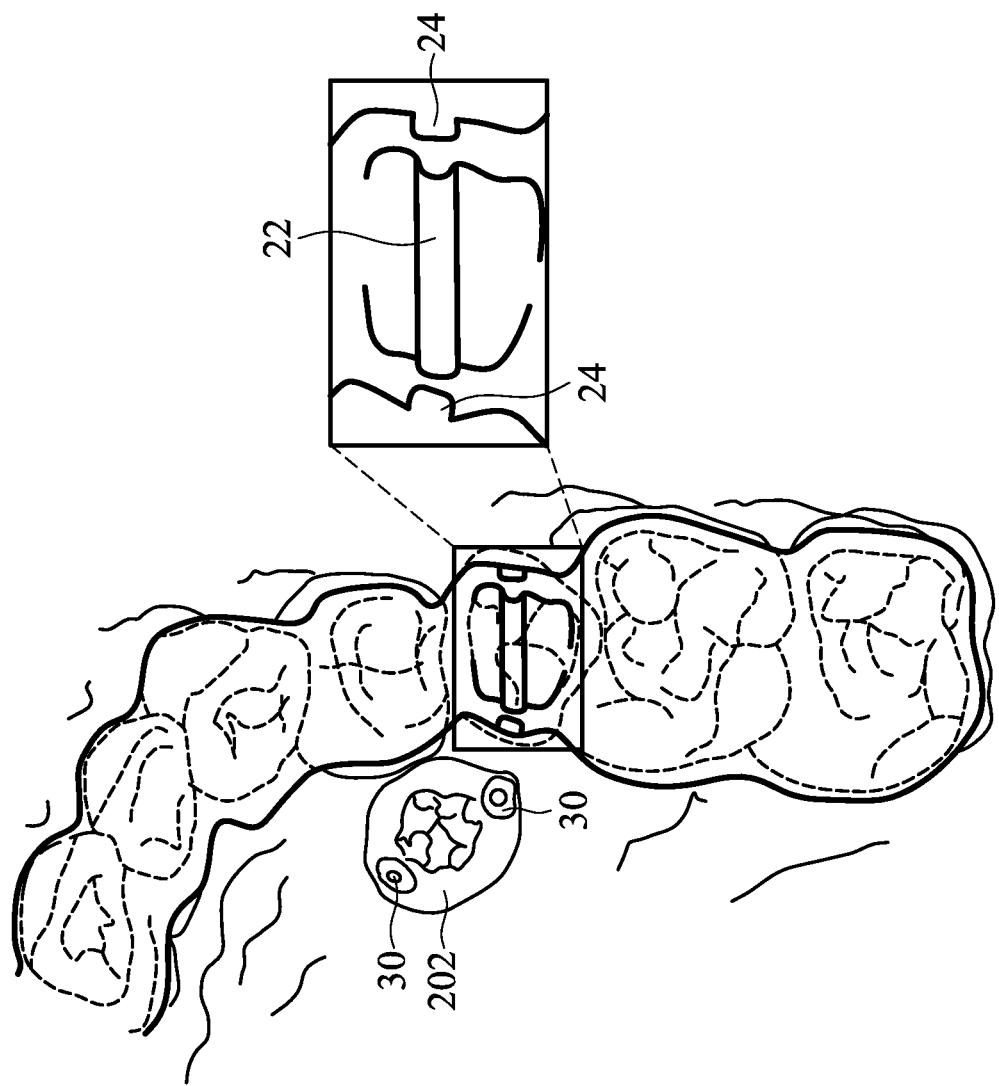
FIG. 3A is a schematic top-down view of a masticatory unit and a partial enlarged view of a first guiding groove on the occlusal surface of the masticatory unit, in accordance with some embodiments.
Figure 3B:
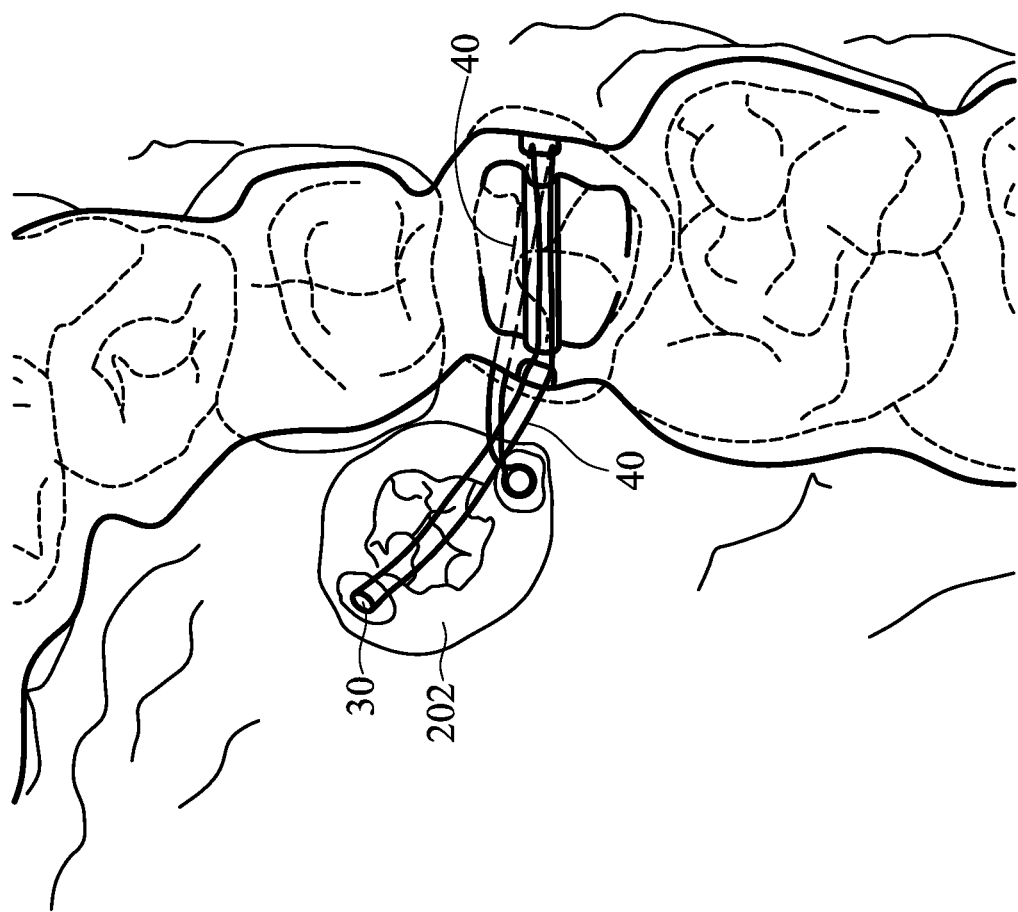
FIG. 3B is a schematic top-down view illustrating how a first elastic member is stretched across the occlusal surface of the masticatory unit, is retained in the first guiding groove, and is coupled with two first connection parts affixed to the opposing buccal surface and lingual surface of a first tooth requiring correction, in accordance with some embodiments.

FIG. 3A is a schematic top-down view of a masticatory unit and a partial enlarged view of a first guiding groove 22 on the occlusal surface of the masticatory unit, in accordance with some embodiments. In FIG. 3A, the first guiding groove 22 is arranged in a similar manner to the first guiding groove 22 illustrated in FIG. 2, and the (misaligned) first tooth 202 that is partially erupted is located on the lingual side of the dental arch. FIG. 3B is a schematic top-down view illustrating how a first elastic member 40 (such as an elastic band) is stretched across the occlusal surface of the masticatory unit, is retained in the first guiding groove 22, and is coupled with two first connection parts 30 affixed to the opposing buccal surface and lingual surface of the first tooth 202 requiring correction, in accordance with some embodiments. With the configuration shown in FIGS. 3A and 3B, the first elastic member 40 can exert a resilient force to move the misaligned first tooth 202 to its desired position (or corrected finish position). In some embodiments, the misaligned first tooth 202 may also be located on the buccal side of the dental arch, and the above device shown in FIGS. 3A and 3B can also guide the first tooth 202 to its desired position.

Figure 3C:
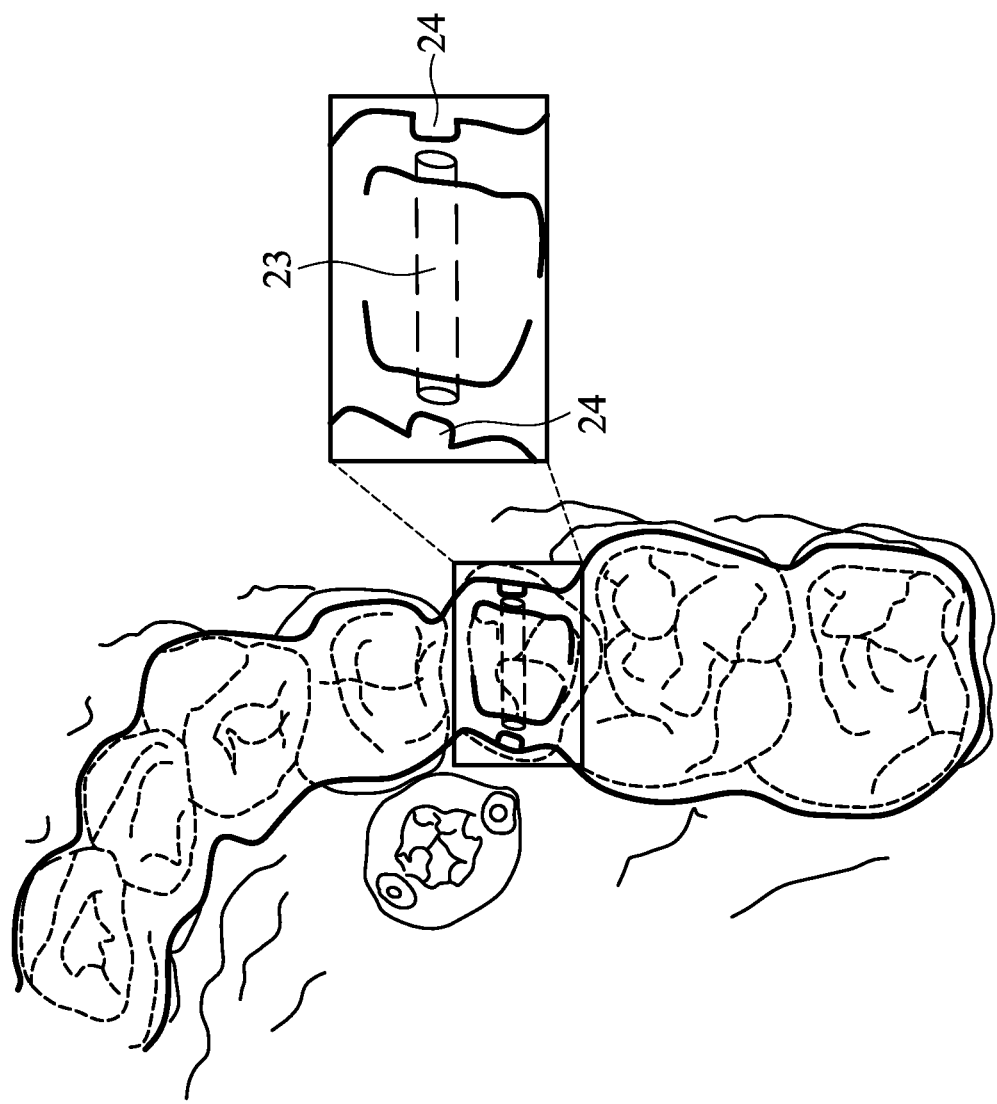
FIG. 3C is a schematic top-down view of a masticatory unit and a partial enlarged view of a guiding hole formed in the wall under the occlusal surface of the masticatory unit, in accordance with some embodiments.

FIG. 3C is a schematic top-down view of a masticatory unit and a partial enlarged view of a guiding hole 23 (indicated by dashed lines) formed in the wall under the occlusal surface of the masticatory unit, in accordance with some embodiments. In FIG. 3C, the wall under the occlusal surface of the masticatory unit has a sufficient thickness (not shown), and a guiding hole 23 is configured to extend from a buccal sidewall (e.g., the right sidewall shown in FIG. 3C) of the masticatory unit through the wall under the occlusal surface of the masticatory unit to a lingual sidewall (e.g., the left sidewall shown in FIG. 3C) of the masticatory unit.

Although not shown, a first elastic member 40 can be configured to pass through the guiding hole 23 to couple with two first connecting parts 30 affixed to the opposing buccal surface and lingual surface of the first tooth 202 (similar to the arrangement illustrated in FIG. 3B), thereby exerting a resilient corrective force against the first tooth 202 in malposition to guide it to the desired position. Similar to the function of the first guiding groove 22 described above, the orientation of the guiding hole 23 can also determine the moving direction of the first tooth.

Figure 4A:
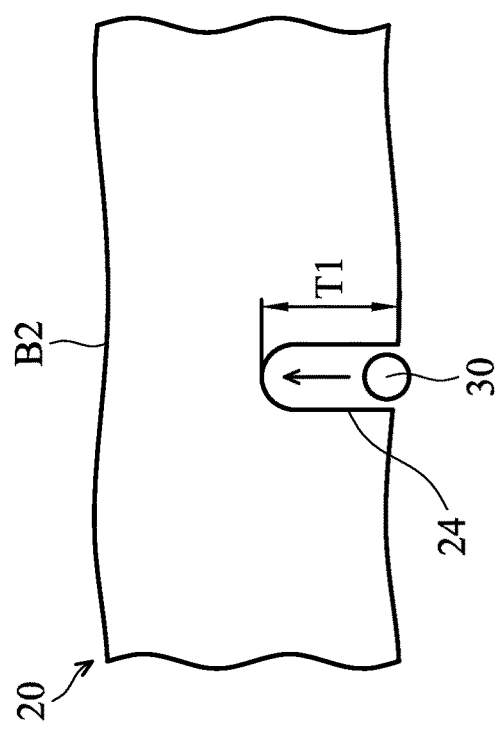
FIG. 4A is a schematic views illustrating the configuration of a guiding opening on the masticatory unit, in accordance with some embodiments.

Referring back to FIG. 2, in some embodiments, a number of (e.g., two) guiding openings 24 may be formed on the opposing buccal sidewall S1 (corresponding to the buccal surface 202A of the first tooth) and lingual sidewall S2 (corresponding to the lingual surface 202B of the first tooth) of the masticatory unit 20, respectively. When the first elastic member 40 drives the first tooth 202 to move, the guiding opening 24 allow the first connection parts 30 affixed to the opposing buccal surface 202A and lingual surface 202B of the first tooth 202 to move therein. In particular, the orientation and the length of the guiding openings 24 determine the moving direction and the moving distance of the first tooth 202. For example, when the first connection parts 30 affixed to the first tooth 202 are driven by the first elastic member 40 to move along the guiding openings 24, the (maximum) moving distance of the first connection parts 30 can be determined by the length (such as the length T1 shown in FIG. 4A or the length T2 shown in FIG. 4B) of the guiding openings 24, and the moving direction (for example, as indicated by the arrow in FIG. 4A or FIG. 4B) of the first connection parts 30 can be determined by the orientation of the guiding openings 24. Therefore, the guiding openings 24 can be configured with different lengths and orientations according to different correction/moving distances and directions required for the unerupted or partially erupted first tooth 202.

Figure 5:
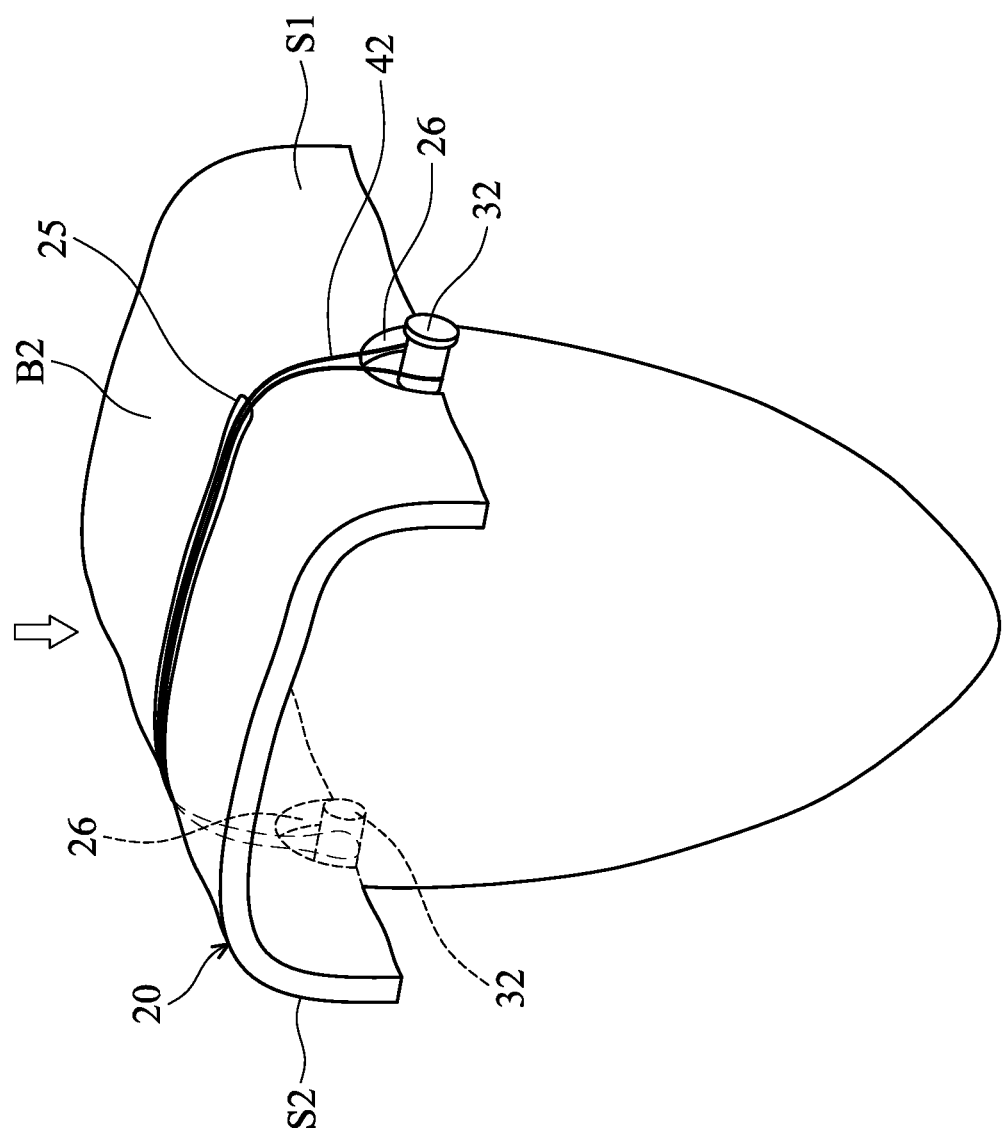
FIG. 5 is a schematic perspective view illustrating the configuration of a second elastic member of the orthodontic correction device, in accordance with some embodiments.

Referring to FIG. 1B and FIG. 5, in order to improve or increase the retention of the masticatory unit on the dental arch (the second masticatory unit 20 on the mandibular dental arch 200 will be described as an example), at least one additional opening 26 is also formed on each of the opposing buccal sidewall S1 and lingual sidewall S2 of the masticatory unit 20, and the additional openings 26 correspond to at least one of the teeth (second teeth) of the mandibular dental arch 200 that do not need orthodontic correction. In addition, the orthodontic correction device 1 may further include a number of (e.g., two) second connection parts 32 and a second elastic member 42. The second connection parts 32 are respectively affixed to the opposing buccal surface and lingual surface of the second tooth exposed by the additional openings 26. The second elastic member 42 is configured to stretch across the occlusal surface B2 of the masticatory unit 20, and both ends of the second elastic member 42 are respectively coupled with two second connection parts 32 affixed to the opposing surfaces of the second tooth. In some embodiments, the additional openings 26 can be configured to close fit with the second connection parts 32 without much moving space. With the above configuration, the resilient force of the second elastic member 42 coupled with the second tooth can cause the masticatory unit 20 to be firmly held on the mandibular dental arch 200 (as indicated by the arrow in FIG. 5).

Moreover, an additional groove 25 may also be formed on the occlusal surface B2 of the masticatory unit 20 for retaining the second elastic member 42 therein. It should be understood that the number and position of the additional openings 26, the second connection parts 32, the second elastic member 42, and the additional groove 25 can be configured according to actual needs. In some embodiments, the structures and materials of the second connection parts 32 and the second elastic member 42 are the same as or similar to those of the first connection parts 30 and the first elastic member 40. Although not shown, the design of the additional openings 26, the second connection parts 32, the second elastic member 42, and the additional groove 25 may also be applied to the masticatory unit 10, so as to improve or increase the retention of the first masticatory unit 10 on the maxillary dental arch 100.

Figure 4B:
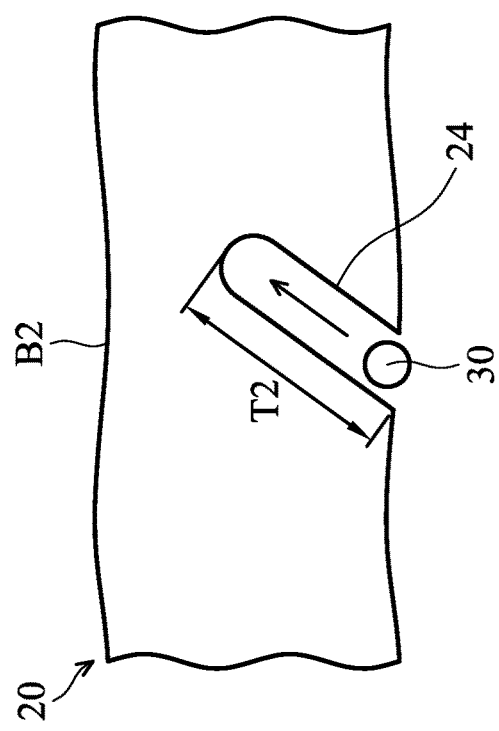
FIG. 4B is a schematic view illustrating the configuration of a guiding opening on the masticatory unit, in accordance with some embodiments.
Figure 6:
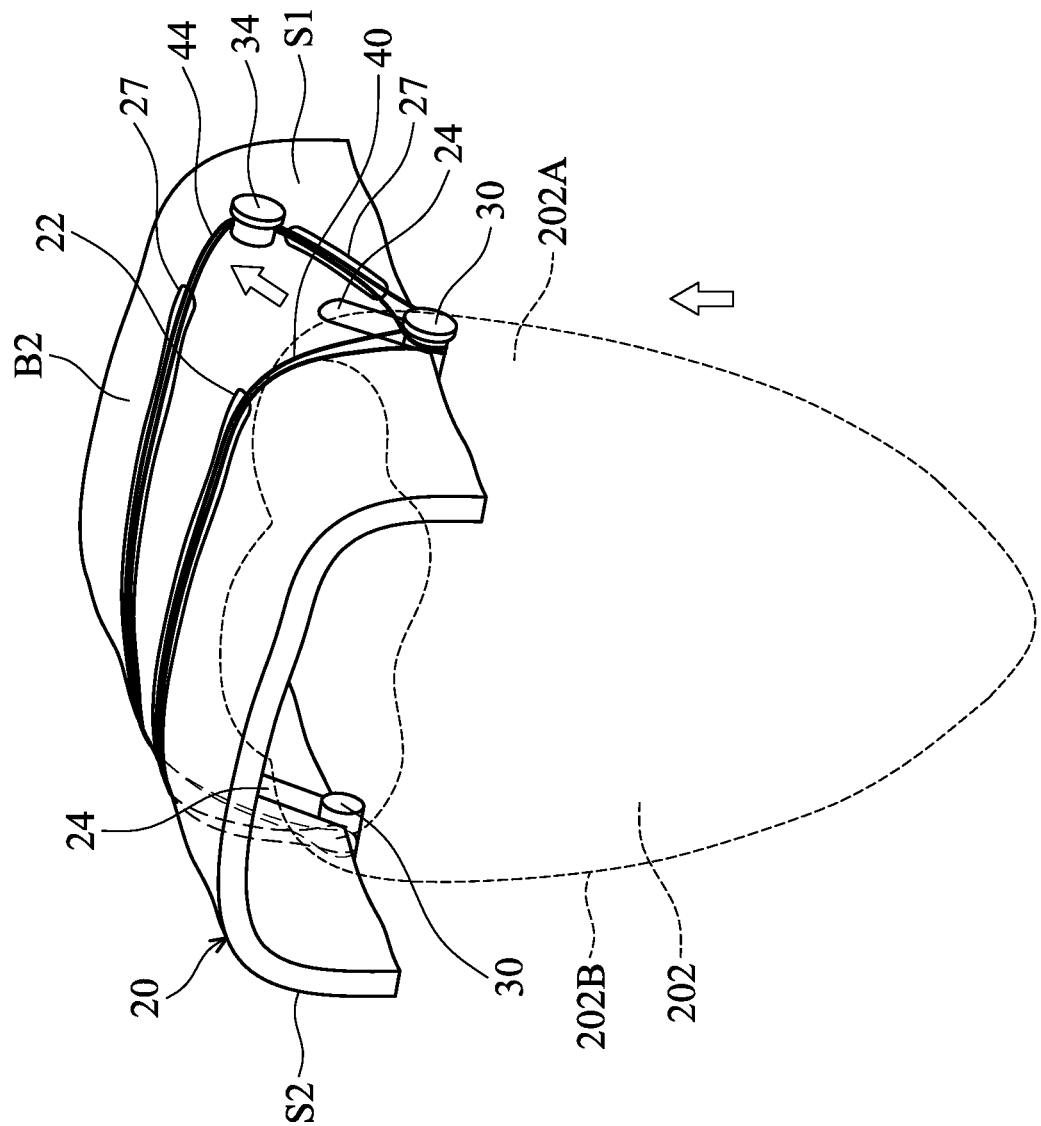
FIG. 6 is a schematic perspective view illustrating the configuration of a first elastic member and a third elastic member of the orthodontic correction device, in accordance with some other embodiments.

Referring to FIG. 6, in some embodiments, the orthodontic correction device 1 may further include at least one third connection part 34 and at least one third elastic member 44 in order to guide the first tooth (such as the first premolar 202 in the mandibular dental arch 200) in a non-vertical upward direction as desired (in this case, each guiding opening 24 may be arranged as shown in FIG. 4B). As shown in FIG. 6, the at least one third connection part 34 may be affixed to at least one of the buccal sidewall S1 and the lingual sidewall S2 of the masticatory unit 20 based on a guided angle required for the first tooth 202, and the at least one third elastic member 44 is configured to couple with the third connection part 34 and at least one of the first connection parts 30 affixed to the first tooth 202, so as to generate an auxiliary resilient force (as indicated by the arrow in FIG. 6) to guide the movement of the first tooth. Thus, the orthodontic correction efficiency can be improved. In some embodiments, the structures and materials of the third connection part 34 and the third elastic member 44 may be the same as those of the first connection parts 30 and the first elastic member 40.

In some embodiments as illustrated in FIG. 6, since the third connection part 34 is affixed to one sidewall (such as the buccal sidewall S1) of the masticatory unit 20 and the third elastic member 44 is configured to stretch across the occlusal surface B2 of the masticatory unit 20 to couple with the first connection parts 30 located on the opposing surfaces of the first tooth 202, at least one additional guiding groove 27 may also be correspondingly provided or formed on at least one of the occlusal surface B2, the buccal sidewall S1, and the lingual sidewall S2 of the masticatory unit 20 for retaining the third elastic member 44 therein and preventing it from slipping freely. Depending on the arrangement position of the third connection part 34 and the connection manner of the third elastic member 44, the arrangement position of the additional guiding groove 27 may also be correspondingly changed.

It should also be understood that, since the occlusal loading generated during mastication of the patient can cause the first tooth 202 to move relative to the surrounding alveolar bone (as described above), the resilient (restoring) force of the above elastic members (such as the first elastic member 40 and the third elastic member 44) can further be utilized to more easily and quickly guide the first tooth 202 to its desired position. In addition, as the first tooth 202 undergoes a slight movement relative to the alveolar bone during mastication, the elastic members each may also maintain its elasticity (i.e., not in a tight state, with intermittent contraction) as the first tooth 202 moves. As a result, the force exerted by the elastic members on the first tooth 202 is less likely to cause discomfort to the patient, and the elastic members are less prone to elastic fatigue.

Furthermore, the orthodontic correction device 1 in the above embodiments is designed to be used during mastication when its orthodontic correction function is activated by occlusal loading. Therefore, for the orthodontic correction device 1 to be functional, it requires features that establish functional occlusion during mastication. For an occlusion to be functional, the maxillary and mandibular teeth should contact in an efficient way without producing trauma for all movements of the jaw during mastication. In the case of the embodiments described above, occlusion takes place through the contact of the worn masticatory units, and the occlusal surfaces of the masticatory units should have features that can establish functional occlusion.

Figure 7:
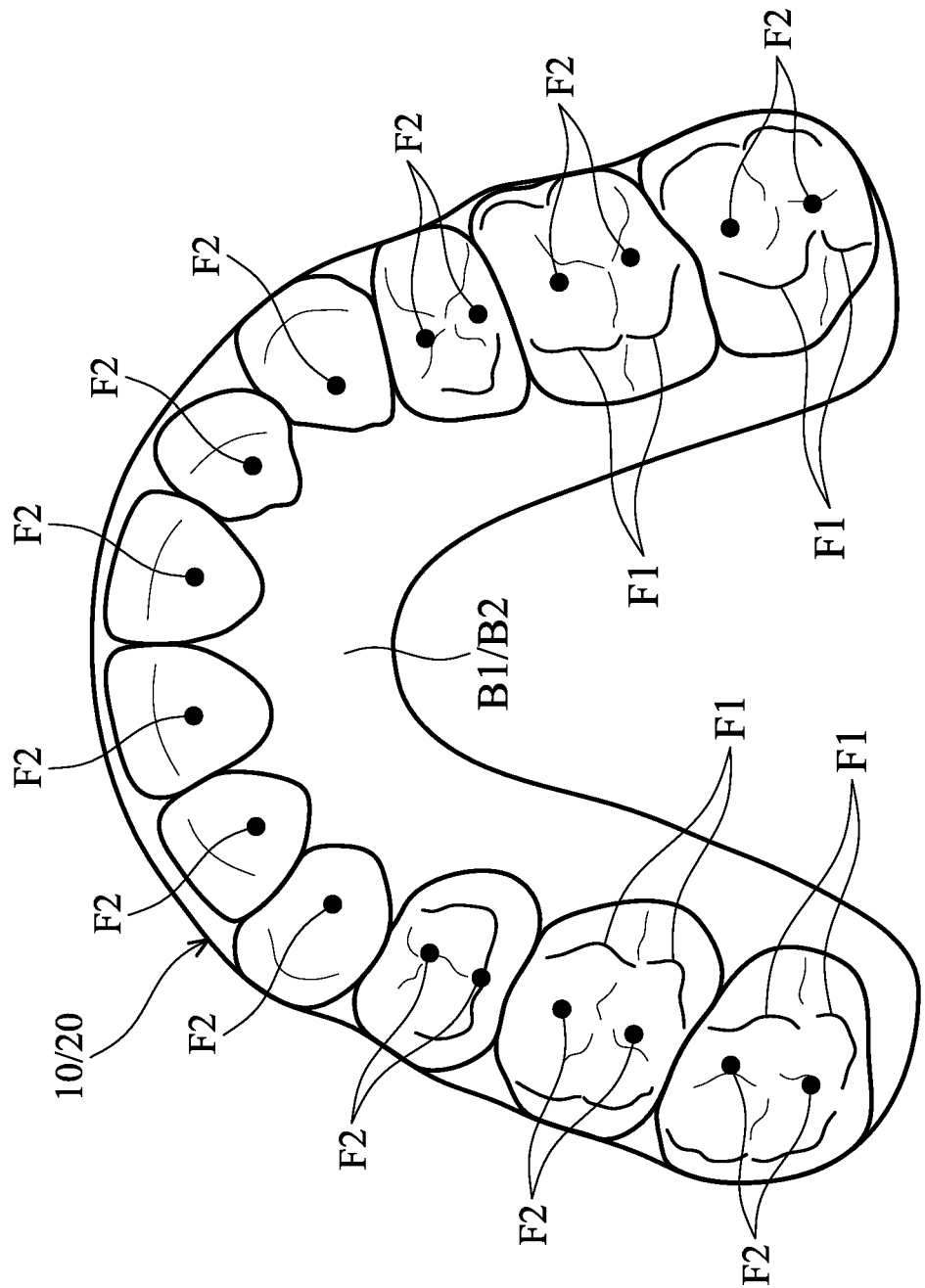
FIG. 7 is a schematic view illustrating the occlusal features on the occlusal surface of one masticatory unit in FIG. 1B, in accordance with some embodiments.
Figure 8:
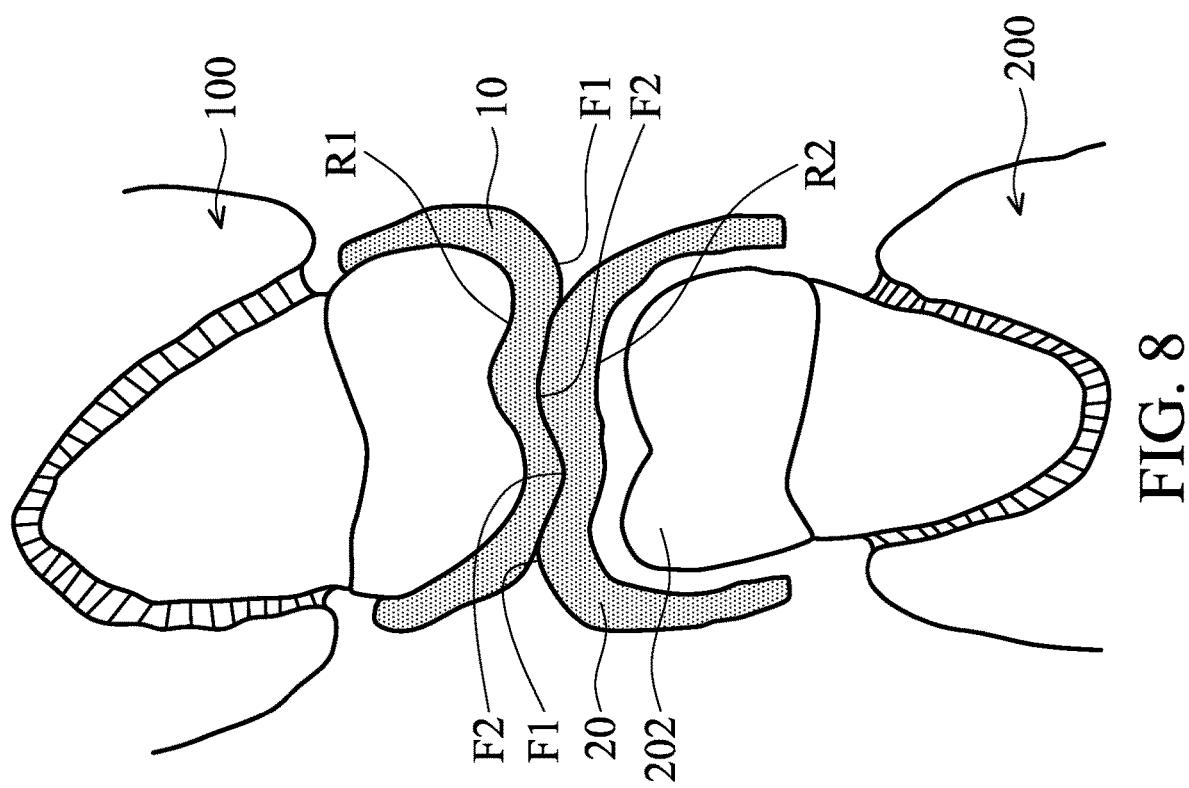
FIG. 8 is schematic cross-sectional view illustrating the first and second masticatory units in occlusion.

FIG. 7 is a schematic view illustrating the occlusal features on the occlusal surface of one masticatory unit 10 or 20 in FIG. 1B, in accordance with some embodiments. As shown in FIG. 7, cusps features F1 and fossae features F2 are formed on the occlusal surface B1 of the masticatory unit 10 or the occlusal surface B2 of the masticatory unit 20, and in a preferred embodiment, all the fossae features F2 are distributed in a curve (e.g. a parabola). In addition, when the first and second masticatory units 10 and 20 make contact (i.e., in occlusion), the cusps features F1 of one masticatory unit contact the fossae features F2 of the other masticatory unit, and vice versa (see FIG. 8). Accordingly, when the patient wears the first and second masticatory units 10 and 20 during mastication, the occlusal points of the first and second masticatory units 10 and 20 (i.e. cusps and fossae features F1 and F2) preferably contact each other simultaneously and separate from each other simultaneously. Also, occlusion occurs with the maximum effective contact area without slipping or other damaging movements, and pressure is more evenly distributed on the first and second masticatory units 10 and 20. Consequently, the effectiveness of correction and comfort of the patient wearing the first and second masticatory units 10 and 20 are improved.

Referring back to FIG. 1B, in some embodiments, the first masticatory unit 10 further has a number of (e.g., two) canine protection features F3 formed on the left and right buccal sidewalls thereof. Each canine protection feature F3 form a guiding surface on the lingual side thereof (not shown) for guiding the second masticatory unit 20. Accordingly, the canine protection features F3 limit the movement range of the second masticatory unit 20 relative to the first masticatory unit 10 in the horizontal direction during mastication, thereby improving the stability and safety of the patient wearing the orthodontic correction device 1.

Although the orthodontic correction device 1 described above includes two masticatory units 10 and 20, it may also include a single masticatory unit placed on the maxillary or mandibular dental arch with at least one tooth in malposition. For example, when the patient's teeth in malposition are maxillary teeth, he can wear a single masticatory unit on his maxillary dental arch. Conversely, the patient can wear a single masticatory unit on his mandibular dental arch. When the patient wears a single masticatory unit on one dental arch, the masticatory unit and the opposing dental arch can also establish functional occlusion through cusps and fossae features on their occlusal surfaces.

Figure 9:
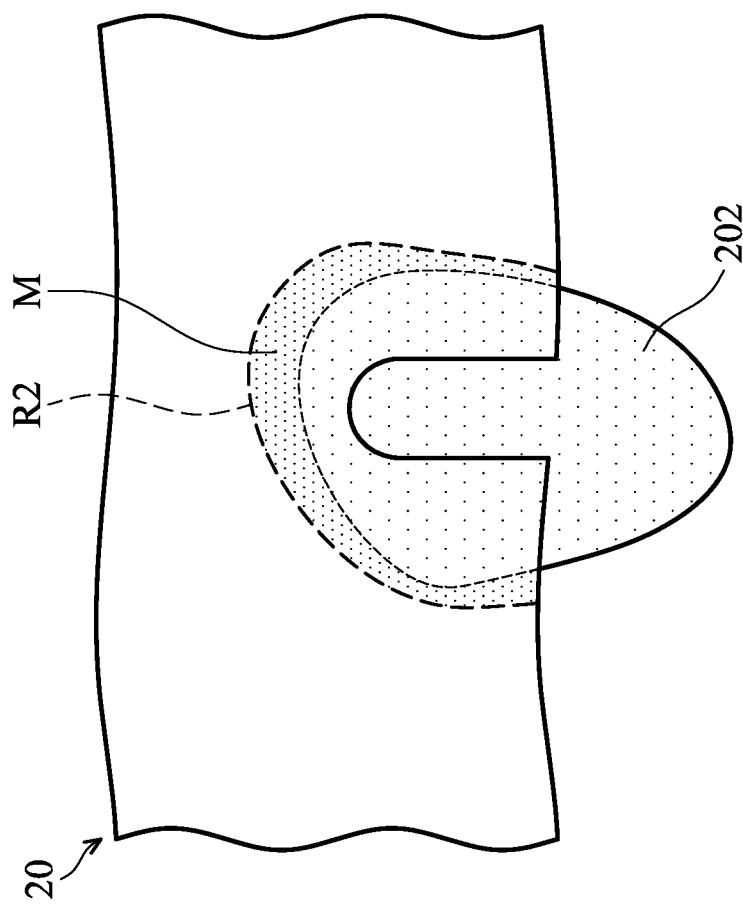
FIG. 9 is a schematic view illustrating a buffering member disposed between a first recess of the masticatory unit and the first tooth.

In some embodiments as illustrated in FIG. 9, a buffering member M may also be disposed between the first recess R2 of the masticatory unit 20 and the first tooth 202 for transmitting and buffering the force between the first recess R2 and the first tooth 202. More specifically, the buffering member M can be an elastic member made of a soft and non-hardening silicon-based material, and can be affixed to the inner surface of the first recess R2 by, for example, adhesive. Preferably, after the first tooth 202 is pulled out of the alveolar bone by the corrective force (including the occlusal loading generated during mastication and the resilient restoring force of the elastic members) of the orthodontic correction device 1, the buffering member M can cover the entire crown of the first tooth 202. It should be understood that after the first tooth 202 is pulled out of the alveolar bone, it may continue to move in the first recess R2 under the action of the occlusal loading. When the first tooth 202 is close to the surface of the first recess R2, the buffering member M can be deformed and cover the crown surface of the first tooth 202, thereby buffering the force and reducing the pain or discomfort felt by the patient. In some embodiments, the designed shape (not shown) of the first recess R2 can also exert a guiding force on the first tooth 202 through the buffering member M, causing the first tooth that is still in malposition and moving to be guided to its desired corrected finish position.

The patient wearing the orthodontic correction device 1 of the above embodiments only needs to use a relatively short correction time (for example, wearing the device 1 several times a day and chewing for 15 to 20 minutes each time) to achieve significant orthodontic correction (moving) effect. Conversely, the wearing (correction) time of the clear aligners used in prior art must be more than 20 hours per day, and the correction effect on the unerupted teeth is also limited.

Many variations or modifications can be made to the embodiments of the invention. For example, the rigid masticatory unit (such as the masticatory unit 10 or 20 in FIGS. 1 to 9) of the orthodontic correction device can be replaced with a non-rigid correction unit, and the guiding groove (such as the first guiding groove 22) for retaining the elastic member (such as the first elastic member 40) formed on the occlusal surface of the masticatory unit can be replaced with multiple raised guiding parts formed on the surface of the correction unit.

Figure 10A:
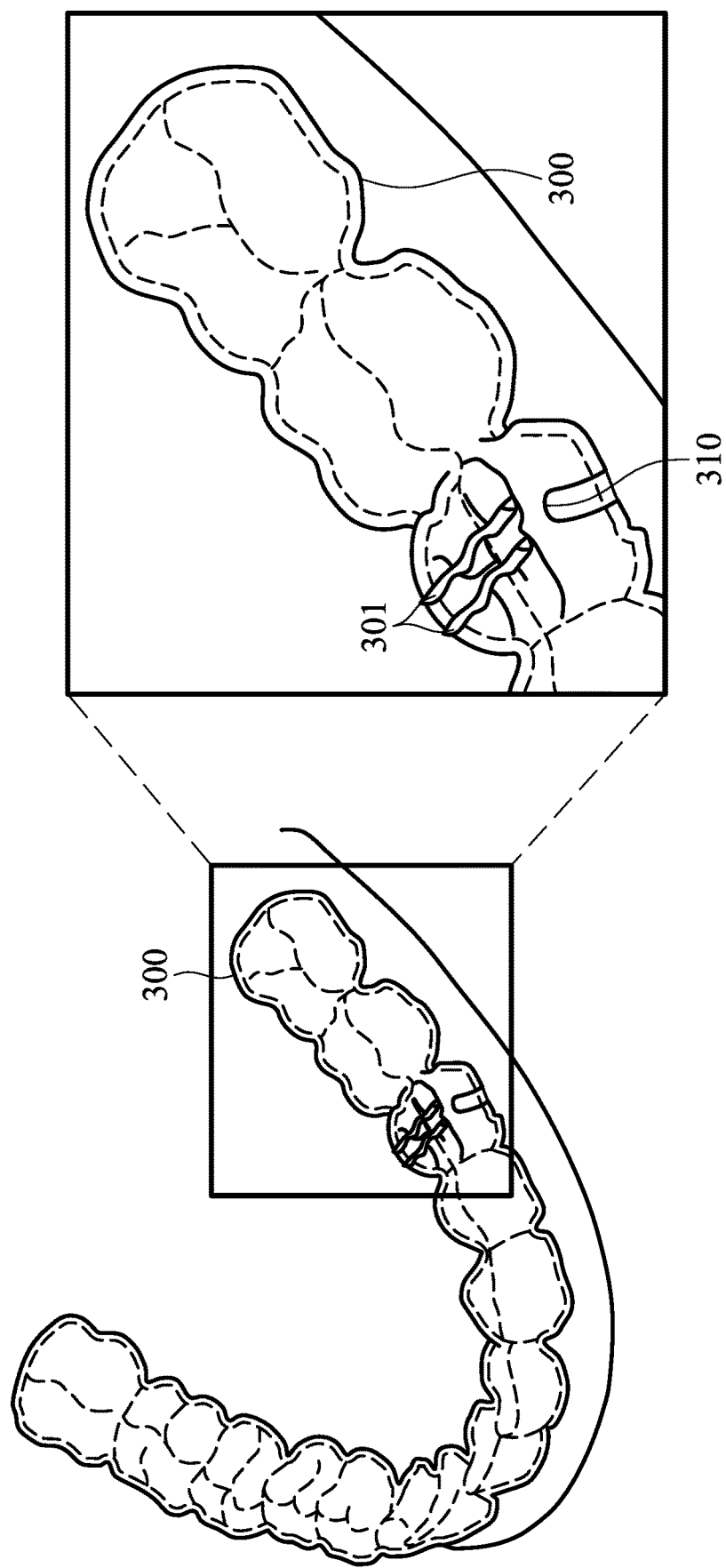
FIG. 10A is a schematic view illustrating a correction unit of an orthodontic correction device having a pair of raised guiding parts formed on the occlusal surface thereof, in accordance with some embodiments.
Figure 10B:
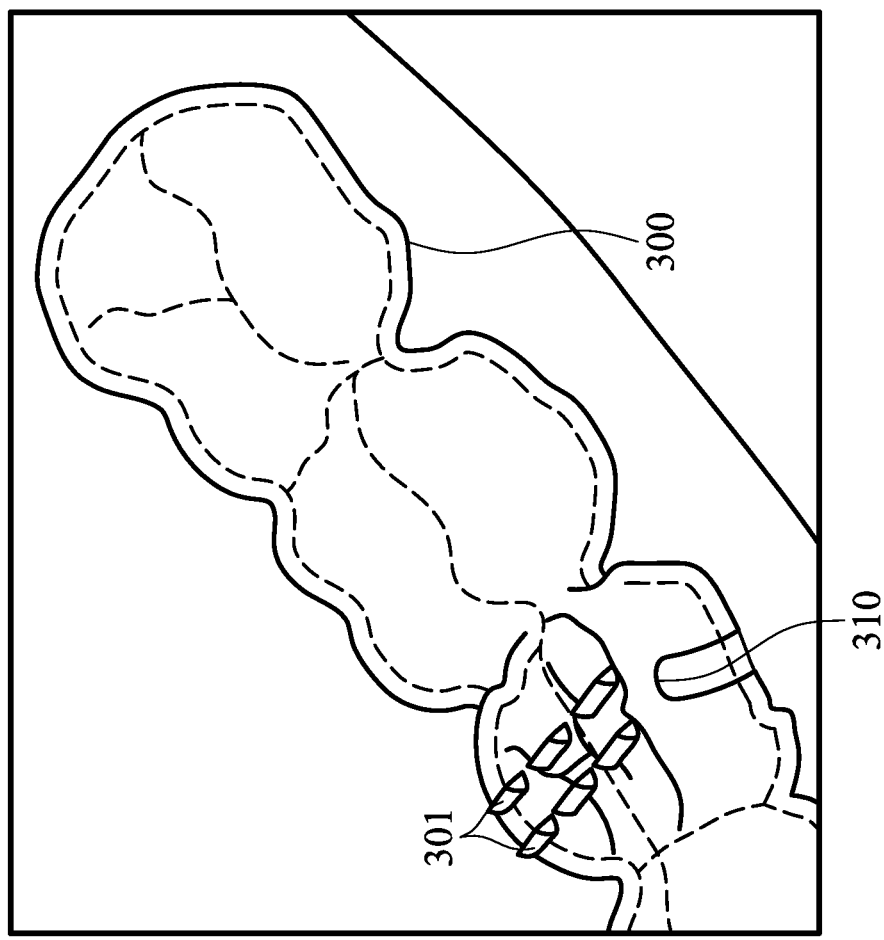
FIG. 10B is a schematic view illustrating a correction unit of an orthodontic correction device having multiple pairs of raised guiding parts formed on the occlusal surface thereof, in accordance with some embodiments.
Figure 10C:
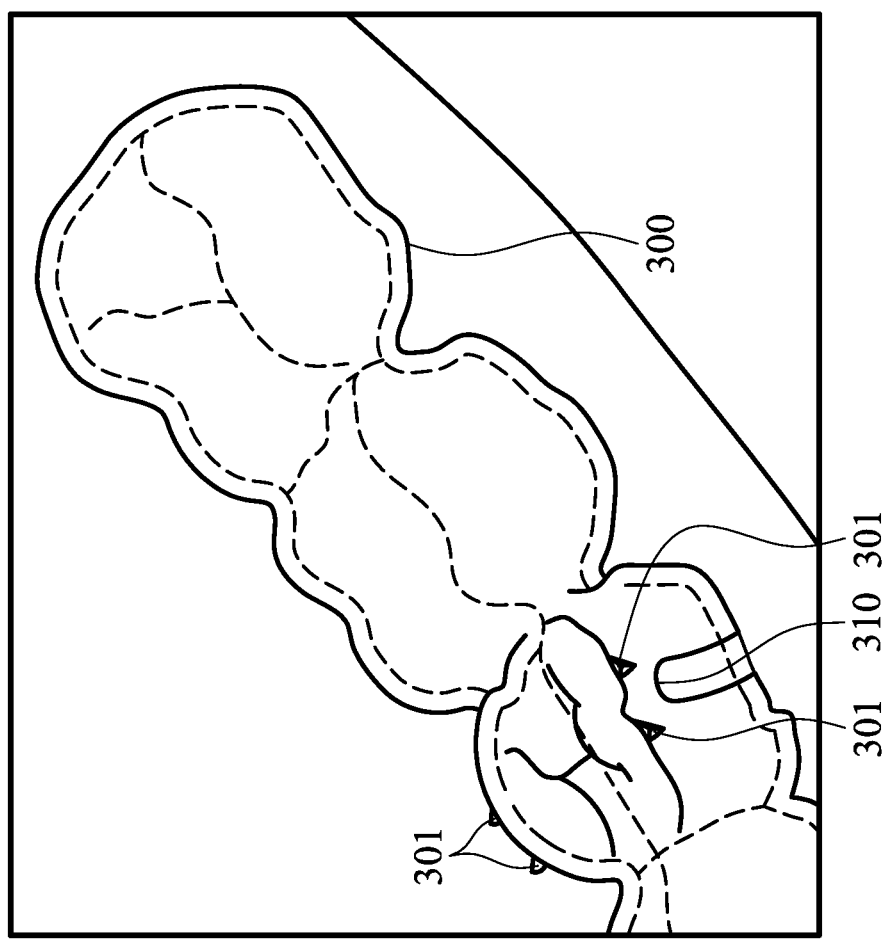
FIG. 10C is a schematic view illustrating a correction unit of an orthodontic correction device having two pairs of raised guiding parts formed on the buccal sidewall and the lingual sidewall thereof, respectively, in accordance with some embodiments.

FIGS. 10A to 10C are schematic views respectively illustrating a correction unit 300 of an orthodontic correction device, in accordance with some embodiments (it should be understood that the orthodontic correction device may include a single or multiple correction unit 300). In some embodiments, the correction unit 300 is configured to be removably worn on the maxillary dental arch or the mandibular dental arch of the patient. The body or shell of the correction unit 300 is thin and flexible. When worn on the dental arch, the correction unit 300 is flexible to accommodate misaligned teeth, and provides a resilient corrective force as it tries to return to its original shape (i.e., deformation). Although not shown, at least one first recess is formed in the correction unit 300 (for example, on the inner surface thereof) for accommodating at least one first tooth of the dental arch that is an unerupted tooth or partially erupted tooth requiring orthodontic correction.

In some embodiments as illustrated in FIG. 10A, a pair of parallel raised guiding parts 301 is formed on the occlusal surface of the correction unit 300 corresponding to the first recess and the first tooth. Preferably, the pair of raised guiding parts 301 may extend from the buccal edge of the occlusal surface of the correction unit 300 to the lingual edge of the occlusal surface that is opposite the buccal edge for retaining a first elastic member (not shown) between the pair of raised guiding parts 301. Similar to the above embodiments, the first elastic member can stretch across the occlusal surface of the correction unit 300 to couple with multiple first connection parts on the opposing surfaces of the first tooth, and the stretched first elastic member can also exert a resilient restoring force against the first tooth to guide it to the desired position. Also, the orientation of the pair of raised guiding parts 301 (the configuration is similar to the above first guiding groove 22, and thus the description is not repeated herein) determines the moving direction of the first tooth.

In some alternative embodiments as illustrated in FIG. 10B, multiple pairs of parallel raised guiding parts 301 may be formed on the occlusal surface of the correction unit 300 and between the opposing buccal edge and lingual edge of the occlusal surface. The feature and function of the raised guiding parts 301 are similar to the raised guiding parts 301 shown in FIG. 10A, and thus the description is not repeated herein. In some other alternative embodiments as illustrated in FIG. 10C, two pairs of parallel raised guiding parts 301 are formed on the opposing buccal sidewall and lingual sidewall of the correction unit 300, respectively. The raised guiding parts 301 can also be used to retain the above first elastic member, and the placement/orientation of the raised guiding parts 301 also determines the moving direction of the first tooth. As shown in FIGS. 10A to 10C, a number of guiding openings 310 may be respectively formed on the buccal sidewall and the lingual sidewall of the correction unit 300 and corresponding to the first tooth. The feature and function of the guiding openings are similar to the guiding openings 24 shown in FIGS. 2, 3, 4 and 6, and the thus description is not repeated herein. In addition, the additional groove 25, the second connection parts 32 and the second elastic member 42 in the above embodiments may also be added to the application of the non-rigid correction unit 300.

As described above, embodiments of the invention provide a variety of non-intrusive and patient removable devices that can effectively and successfully guide the unerupted or partially erupted teeth positioned below the occlusal surface to their desired positions (e.g., the fully erupted and normal positions), which overcomes the problem that the traditional orthodontic appliances are difficult to correct teeth that are not fully erupted.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An orthodontic correction device, comprising:
   a masticatory unit with a rigid body configured to be removably worn on a dental arch, wherein the masticatory unit does not deform when accommodating misaligned teeth of the dental arch, and a material strength of the masticatory unit is sufficient to withstand an occlusal loading generated during mastication;
   a first recess formed in the masticatory unit and configured to accommodate a first tooth of the dental arch that is an unerupted or partially erupted tooth requiring orthodontic correction, wherein the first recess has a shape that allows the first tooth to move from an initial position to a desired position;
   a first guiding groove formed on an occlusal surface of the masticatory unit that is exposed to another dental arch opposite to the dental arch, wherein the first guiding groove does not penetrate through the masticatory unit to expose the first tooth;
   a plurality of first connection parts respectively affixed to a buccal surface and a lingual surface of the first tooth opposite to each other; and
   a first elastic member configured to be stretched across the occlusal surface of the masticatory unit, be retained in the first guiding groove, and be coupled with the plurality of first connection parts affixed to the first tooth, wherein the occlusal loading generated during mastication is transmitted to teeth of the dental arch through the masticatory unit and activates the first elastic member to drive the first tooth to the desired position, and an orientation of the first guiding groove determines a moving direction of the first tooth.

2. The orthodontic correction device as claimed in claim 1, wherein the masticatory unit further has a plurality of second recesses configured to accommodate second teeth of the dental arch which do not require orthodontic correction, wherein shapes of the second recesses conform to shapes of the second teeth, and the occlusal loading generated during mastication is transmitted to the second teeth and the first tooth adjacent to the second teeth through the second recesses of the masticatory unit.

3. The orthodontic correction device as claimed in claim 2, wherein the masticatory unit further has a plurality of guiding openings respectively formed on a buccal sidewall and a lingual sidewall of the masticatory unit and corresponding to the first tooth, wherein when the first elastic member drives the first tooth to move, the guiding openings allow the first connection parts affixed to the buccal surface and the lingual surface of the first tooth to move therein, and an orientation and a length of the guiding openings determine a moving direction and a moving distance of the first tooth.

4. The orthodontic correction device as claimed in claim 2, wherein the masticatory unit further has a plurality of additional openings respectively formed on a buccal sidewall and a lingual sidewall of the masticatory unit and corresponding to one of the second teeth, and the orthodontic correction device further comprises a plurality of second connection parts and a second elastic member, wherein the second connection parts are respectively affixed to a buccal side and a lingual side of the second tooth exposed by the additional openings, and the second elastic member is configured to stretch across the occlusal surface of the masticatory unit to couple with the second connection parts affixed to the second tooth, so as to increase the retention of the masticatory unit on the dental arch.

5. The orthodontic correction device as claimed in claim 4, wherein the occlusal surface of the masticatory unit further forms an additional groove configured to retain the second elastic member therein.

6. The orthodontic correction device as claimed in claim 4, further comprising a third connection part and a third elastic member, wherein the third connection part is affixed to one of the buccal sidewall and the lingual sidewall of the masticatory unit, and the third elastic member is configured to couple with the third connection part and at least one of the first connection parts affixed to the first tooth, so as to generate an auxiliary resilient force to guide the movement of the first tooth.

7. The orthodontic correction device as claimed in claim 6, wherein at least one additional guiding groove is further formed on at least one of the occlusal surface, the buccal sidewall and the lingual sidewall of the masticatory unit and configured to retain the third elastic member therein.

8. The orthodontic correction device as claimed in claim 1, wherein the occlusal surface of the masticatory unit further has a plurality of cusps features and a plurality of fossae features.

9. An orthodontic correction device, comprising:
a masticatory unit with a rigid body configured to be removably worn on a dental arch, wherein the masticatory unit does not deform when accommodating misaligned teeth of the dental arch, and a material strength of the masticatory unit is sufficient to withstand an occlusal loading generated during mastication;
a first recess formed in the masticatory unit and configured to accommodate a first tooth of the dental arch that is an unerupted or partially erupted tooth requiring orthodontic correction, wherein the first recess has a shape that allows the first tooth to move from an initial position to a desired position;
a guiding hole passing under an occlusal surface of the masticatory unit that is exposed to another dental arch opposite to the dental arch, wherein the guiding hole passes through the masticatory unit from a buccal sidewall of the masticatory unit to a lingual sidewall of the masticatory unit that is opposite the buccal sidewall, wherein the guiding hole does not expose the first tooth;
a plurality of first connection parts respectively affixed to a buccal surface and a lingual surface of the first tooth opposite to each other; and
a first elastic member configured to pass through the guiding hole to couple with the plurality of first connection parts affixed to the first tooth, wherein the occlusal loading generated during mastication is transmitted to teeth of the dental arch through the masticatory unit and activates the first elastic member to drive the first tooth to the desired position, and an orientation of the guiding hole determines a moving direction of the first tooth.

10. An orthodontic correction device, comprising:
a correction unit configured to be removably worn on a dental arch, wherein when worn, the correction unit is flexible to accommodate misaligned teeth of the dental arch;
a first recess formed in the correction unit and configured to accommodate a first tooth of the dental arch that is an unerupted or partially erupted tooth requiring orthodontic correction;
a plurality of raised guiding parts formed on at least one surface of the correction unit corresponding to the first tooth, wherein the at least one surface is exposed to the environment of a mouth, and the raised guiding parts are parallel to each other and protruding from the at least one surface;
a plurality of first connection parts respectively affixed to a buccal surface and a lingual surface of the first tooth opposite to each other; and
a first elastic member configured to stretch across an occlusal surface of the correction unit that is exposed to another dental arch opposite to the dental arch, be retained between and guided by the raised guiding parts, and be coupled with the plurality of first connection parts affixed to the first tooth, so as to generate a resilient force to drive the first tooth to a desired position, wherein an orientation of the raised guiding parts determines a moving direction of the first tooth.

11. The orthodontic correction device as claimed in claim 10, wherein the raised guiding parts include a pair of raised guiding parts formed on the occlusal surface of the correction unit and extending from a buccal edge of the occlusal surface to a lingual edge of the occlusal surface that is opposite the buccal edge.

12. The orthodontic correction device as claimed in claim 10, wherein the raised guiding parts include multiple pairs of raised guiding parts formed on the occlusal surface of the correction unit and between a buccal edge of the occlusal surface and a lingual edge of the occlusal surface that is opposite the buccal edge.

13. The orthodontic correction device as claimed in claim 10, wherein the raised guiding parts include multiple pairs of raised guiding parts respectively formed on a buccal sidewall of the correction unit and a lingual sidewall of the correction unit that is opposite the buccal sidewall.

* * * * *